(12) United States Patent
Sharma

(10) Patent No.: US 10,931,198 B2
(45) Date of Patent: Feb. 23, 2021

(54) BUCK-BOOST POWER CONVERTER CONTROLLER

(71) Applicant: TEXAS INSTRUMENTS INCORPORATED, Dallas, TX (US)

(72) Inventor: Anmol Sharma, Freising (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/158,944

(22) Filed: Oct. 12, 2018

(65) Prior Publication Data

US 2019/0181759 A1 Jun. 13, 2019

Related U.S. Application Data

(60) Provisional application No. 62/596,556, filed on Dec. 8, 2017.

(51) Int. Cl.
| | | |
|---|---|---|
| *H02M 3/158* | (2006.01) | |
| *H02M 1/08* | (2006.01) | |
| *H02M 1/00* | (2006.01) | |

(52) U.S. Cl.
CPC ........... *H02M 3/1582* (2013.01); *H02M 1/08* (2013.01); *H02M 2001/0003* (2013.01); *H02M 2001/0009* (2013.01)

(58) Field of Classification Search
CPC ..... H02M 3/1582; H02M 3/156; H02M 3/158
USPC ................. 323/259, 282, 283, 344
See application file for complete search history.

(56) References Cited

U.S. PATENT DOCUMENTS

| | | | | |
|---|---|---|---|---|
| 9,698,674 | B1* | 7/2017 | Cherkassky | H02M 3/1582 |
| 2006/0176038 | A1* | 8/2006 | Flatness | H02M 3/156 |
| | | | | 323/282 |
| 2011/0241636 | A1* | 10/2011 | Wu | H02M 3/1584 |
| | | | | 323/272 |
| 2012/0274295 | A1* | 11/2012 | Lin | H02M 3/1582 |
| | | | | 323/282 |
| 2015/0256078 | A1* | 9/2015 | Tanabe | H02M 3/1582 |
| | | | | 323/271 |
| 2017/0207703 | A1* | 7/2017 | Houston | H02M 3/1582 |
| 2017/0257031 | A1* | 9/2017 | Shao | H02M 3/1582 |
| 2018/0287489 | A1* | 10/2018 | Ozanoglu | H02M 1/15 |
| 2018/0342951 | A1* | 11/2018 | Dias | H02M 3/156 |

FOREIGN PATENT DOCUMENTS

WO 2013102879 A1 7/2013

OTHER PUBLICATIONS

Linear Technology, "200mA Buck-Boost Synchronous DC/DC Converters," LT 0807 Rev B, Linear Technology Corporation 2006, 16 p.
Search Report for PCT Application No. PCT/US18/64761, date of mailing of the international search report dated Apr. 2019.

* cited by examiner

*Primary Examiner* — Alex Torres-Rivera
(74) *Attorney, Agent, or Firm* — Mark Allen Valetti; Charles A. Brill; Frank D. Cimino

(57) ABSTRACT

Aspects of the present disclosure provide for a circuit. In an example, the circuit comprises a buck-boost region detector. The buck-boost region detector comprises a timing criterions circuit that comprises a timer, a mode determination circuit coupled to the timing criterions circuit and comprising a processing element, and a switching circuit coupled to the mode determination circuit and comprising a digital logic structure.

13 Claims, 7 Drawing Sheets

BUCK-BOOST POWER CONVERTER CONTROLLER

CROSS-REFERENCE TO RELATED APPLICATIONS

The present application claims priority to U.S. Provisional Patent Application No. 62/596,556, which was filed Dec. 8, 2017, is titled "Power Converter Controller," and is hereby incorporated herein by reference in its entirety.

SUMMARY

At least some aspects of the present disclosure provide for a circuit. In an example, the circuit comprises a buck-boost region detector. The buck-boost region detector comprises a timing criterions circuit that comprises a timer, a mode determination circuit coupled to the timing criterions circuit and comprising a processing element, and a switching circuit coupled to the mode determination circuit and comprising a digital logic structure.

Other aspects of the present disclosure provide for a switched mode power supply (SMPS). In an example, the SMPS comprises a power converter and a power converter controller. The power converter controller comprises a loop controller configured to couple to the power converter to monitor at least one electrical characteristic of the power converter and generate a control signal based at least partially on the monitored electrical characteristic of the power converter, a buck-boost region detector coupled to the power converter and the loop controller, and a gate driver. The buck-boost region detector comprises a timing criterions circuit that comprises a timer, a mode determination circuit coupled to the timing criterions circuit and comprising a processing element, and a switching circuit coupled to the mode determination circuit and comprising a digital logic structure. The gate driver is configured to couple to the power converter, the power converter controller, and the buck-boost region detector to control the power converter based at least partially on an output of the switching circuit.

Other aspects of the present disclosure provide for a method. In an example, the method, comprises receiving a signal representative of an inductor current of a power converter, determining one or more timing criterions associated with the signal representative of the inductor current of the power converter, determining a mode of operation of the power converter according to the signal representative of the inductor current of the power converter and the one or more timing criterions, generating one or more mode transition control signals, and generating one or more control signals based on the generated mode transition control signals.

BRIEF DESCRIPTION OF THE DRAWINGS

For a detailed description of various examples, reference will now be made to the accompanying drawings in which.

DETAILED DESCRIPTION

Figure 1:
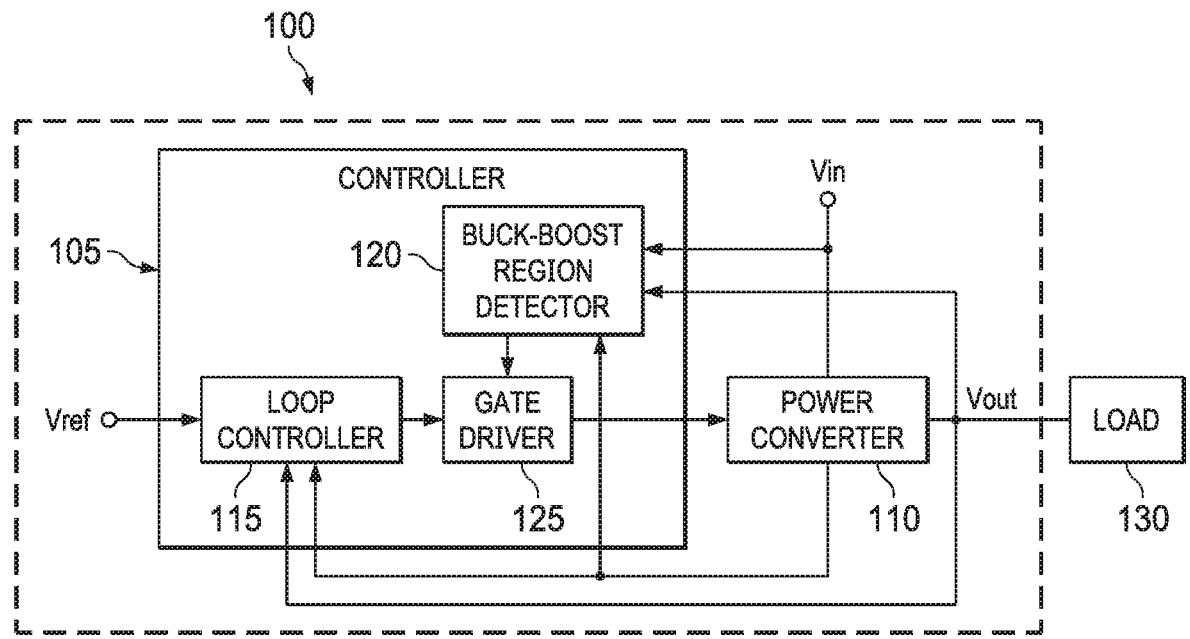
FIG. 1 is a block diagram of an illustrative switched mode power supply (SMPS)

A switched mode power supply (SMPS) transfers power from an input power source to a load by switching one or more power transistors coupled through a switch node/terminal to an energy storage element (such as an inductor/transformer and/or capacitor), which is capable of coupling to the load. The power transistors can be included in a power converter that includes, or is capable of coupling to, the energy storage element. An SMPS can include an SMPS controller to provide one or more gate drive signals to the power transistor(s). In some architectures (such as buck, boost, and/or buck-boost), the SMPS includes, or is capable of coupling to, an output/bulk capacitor in parallel with the load, and the SMPS controller switches the power transistor(s) to form circuit arrangements with the energy storage element(s) to supply a load current to the load and/or to the output/bulk capacitor to maintain a regulated output voltage (e.g., by filtering the switched load current). For example, a power transistor can be coupled through the switch node/terminal to an energy storage inductor, which is switched by the SMPS controller between charge and discharge cycles to supply inductor current (e.g., current through an energy storage inductor) to the load and to the output/bulk capacitor to filter the inductor current to maintain the regulated output voltage. In some examples, an SMPS can be configured for operation as a constant current source with an energy storage element but with no output/bulk capacitor.

The power transistors may be implemented as metal oxide semiconductor field effect transistors (MOSFETs) or other suitable solid-state transistor devices (e.g., such as bi-polar junction transistors (BJTs)). During a mode of operation of the power converter (such as a buck-boost power converter) in which a value of the input voltage is near a value of the output voltage (sometimes referred to as a buck-boost region), the power converter may oscillate between operating in a buck mode of operation and a boost mode of operation to provide an output voltage (Vout). Additionally, in some examples, the power converter may continue operation in the buck mode of operation or in the boost mode of operation for a period of time longer than desirable for optimal (e.g., efficient) operation of the power converter as a result of a difficulty in identifying the buck-boost region and/or implementing control of the power converter while operating in the buck-boost region. For example, when the power converter continues operation in the buck mode of operation or in the boost mode of operation for a period of time longer than desirable, ringing, or oscillation above and below an intended value, of Vout may result in decreased efficiency of the power converter.

At least some aspects of the present disclosure relate to a controller that may be suitable for implementation for controlling a power converter, such as in a SMPS. In at least one example, the controller includes circuitry suitable for determining a mode of operation for controlling the power converter. For example, the controller includes circuitry suitable for determining that the power converter is operating in a buck region and controlling the power converter according to a buck mode of operation, determining that the power converter is operating in a boost region and controlling the power converter according to a boost mode of operation, and/or determining that the power converter is operating in a buck-boost region and controlling the power converter according to a buck-boost mode of operation. In at least some examples, the circuitry is a buck-boost region detector or includes a buck-boost region detector.

In some examples, the circuitry includes a timing generator circuit, a timing criterions circuit, a mode determination circuit, and a switching circuit. In other examples, one or more of the timing generator circuit, the timing criterions circuit, the mode determination circuit, and/or the switching circuit may be omitted from the circuitry and/or functions of one of the timing generator circuit, the timing criterions circuit, the mode determination circuit, or the switching circuit combined with another of the timing generator circuit, the timing criterions circuit, the mode determination circuit, or the switching circuit. The timing generator circuit, in some examples, calculates, measures, and/or otherwise determines timing information associated with controlling the power converter and/or operation of the power converter. For example, at least one implementation of the timing generator circuit determines an on-time (Ton), an off-time (Toff) and/or a common time (COM) associated with controlling the power converter and/or operation of the power converter. The timing generator circuit determines the Ton, Toff, or COM according to any suitable method, the scope of which is not limited herein. In some examples, the timing generator circuit may be omitted such that information relating to Ton, Toff, and/or COM is received by the circuitry from the power converter and/or from another component of, or coupled to, the controller (e.g., such as a gate driver).

The timing criterions circuit, in some examples, includes one or more timing circuits that monitor Ton and/or Toff and generates one or more signals indicating that Ton and/or Toff have exceeded a threshold. The mode determination circuit, in some examples, compares data received from the timing generator circuit and/or the timing criterions circuit, in some examples as well as other received signals associated with operation of the power converter, to generate one or more control signals for further controlling the power converter. In at least some examples, the mode determination circuit includes one or more analog and/or digital components suitable for performing logical processing such that the mode determination circuit implements a state machine. Based on one or more inputs received by the mode determination logic, the state machine transitions from a first state to a second state and outputs a signal associated with the second state. The switching circuit, in some examples, receives the signal from the mode determination circuit and generates and outputs a signal indicating a mode of operation, for example, for use by the controller in controlling the power converter.

Referring now to FIG. 1, a block diagram of an illustrative SMPS 100 is shown. In at least one example, the SMPS 100 includes a controller 105 and a power converter 110. The power converter 110 is, for example, a buck-boost power converter that is capable of operating in a buck-boost region. In other examples, the power converter 110 is any other type of power converter such as a buck power converter, a boost power converter, or a hybrid power converter. In at least one example, the controller 105 includes, or is configured to couple to, a loop controller 115, a buck-boost region detector 120, and a gate driver 125. At least one example of the SMPS 100 includes at least some aspects of the controller 105 and the power converter 110 on a same semiconductor die and/or in a same component package, while in other examples the controller 105 and the power converter 110 may be fabricated separately and configured to couple together. For example, at least some aspects of the controller 105 may be fabricated separately and coupled together. Accordingly, while illustrated as including the gate driver 125, in at least one example the controller 105 does not include the gate driver 125 and instead is configured to couple to the gate driver 125.

In at least one example, the SMPS 100 is configured to receive an input voltage (Vin) from an input power source (not shown) and provide Vout at an output terminal based at least partially on the input voltage and a reference voltage (Vref) received by the SMPS 100. Vref may be received from any suitable device (not shown) such as a processor, microcontroller, or any other device exerting control over the SMPS 100 to control a value of Vout and may be, or be representative of, a predetermined (e.g., user-desired, target, preconfigured, programmed, etc.) value for Vout. The SMPS 100, in at least one example, provides Vout to a load 130 that is coupled to the SMPS 100 (e.g., coupled to the SMPS 100 at an output of the power converter 110). In at least one example, the controller 105 receives one or more signals from the power converter 110. For example, the controller 105 may receive Vout from the power converter 110 and/or a value representative of an inductor current (IL) of the power converter 110. In various examples, the value representative of IL may be a value directly measured from an inductor (not shown) of the power converter 110 (or a terminal of another component of the power converter 110 to which the inductor is also coupled) or a value sensed from a sense element (not shown) of the power converter 110. The sense element is, for example, a sense resistor, a transistor, or any other component or combination of components capable of measuring IL of the power converter 110 and providing the value representative of IL to the controller 105.

In at least one example, the loop controller 115 is coupled to the gate driver 125 and the power converter 110 and is configured to receive Vref and Vout, for example, at least partially for use in controlling the gate driver 125. In another example, the loop controller 115 further receives the value representative of IL from the sense element of the power converter 110 further for use in controlling the gate driver 125. Based on the received inputs (e.g., Vin, Vout, the value representative of IL, and/or Vref), the loop controller 115 controls the gate driver 125 to control power transistors (not shown) of the power converter 110 to generate Vout. In one example, the gate driver 125 controls the power converter 110 according to a peak current mode implementation of the power converter 110 in which the power transistors of the power converter 110 are controlled based on IL of the power converter 110 rising to meet a threshold (e.g., such as based at least partially on Vref). In another example, the gate driver 125 controls the power converter 110 according to a valley mode implementation of the power converter 110 in which the power transistors of the power converter 110 are controlled based on IL of the power converter 110 falling to meet a threshold (e.g., such as based at least partially on Vref). For example, the loop controller 115 controls the gate driver 125 to control Ton of the power transistors in a peak current mode implementation of the power converter 110, or Toff of the power transistors in a valley current mode implementation of the power converter 110, by providing at least one control signal to the gate driver 125.

In at least one example, the loop controller 115 integrates Vout (or a scaled version of Vout, such as scaled via a voltage divider) and Vref. In another example, the loop controller 115 compares Vout (or a scaled version of Vout, such as scaled via a voltage divider) to Vref. A result of the integration (or the comparison) is compared to the value representative of IL. A result of the comparison is, for example, used to control the gate driver 125. In at least one example, the output of the comparison may be a logical high signal when the value representative of IL is less than the result of the integration (or the comparison) and the power converter 110 is implemented using the peak current mode implementation. When the value representative of IL is not less than the result of the integration (or the comparison) the output of the comparison may be a logical low signal. In another example, the output of the comparison may be a logical high signal when the value representative of IL is greater than the result of the integration (or the comparison) and the power converter 110 is implemented using the valley current mode implementation. When the value representative of IL is not greater than the result of the integration (or the comparison) the output of the comparison may be a logical low signal. In various examples, the loop controller 115 includes any suitable circuitry or components for controlling the gate driver 125 to control the power converter 110 at a switching frequency (fsw) as disclosed herein.

In at least one example, the loop controller 115 may comprise an integrator (not shown) and a comparator (not shown). In another example, the loop controller 115 may further include, or be coupled to, a voltage divider (not shown) that may scale the value of Vout. In another example, the loop controller 115 may further include one or more supporting components (not shown) such as resistors, capacitors, diodes, and the like, a scope of which is not limited herein. In some examples, the loop controller 115 may include a COM generator (not shown) that may generate a COM1 and/or COM2 time. The COM1 and/or COM2 time, for example, may be a period of time in which Vout is shorted to Vin in the power converter 110, such as through an energy storage element (e.g., an inductor). The COM generator may be, for example, a resistor-capacitor (RC) timer or other form of timer, a scope of which is not limited herein. In some examples, the loop controller 115 may provide any number of control signals to the gate driver 125 to control the gate driver 125.

In at least one example, the buck-boost region detector 120 is any circuitry suitable for determining a current region of operation of the power converter 110 (e.g., buck region, boost region, or buck-boost region) and/or selecting a mode for control (e.g., control according to a buck mode, a boost mode, or a buck-boost mode) of the power converter 110 by the gate driver 125. In one example, the buck-boost region detector 120 receives IL and determines a region of operation of the power converter 110 based on IL. For example, the buck-boost region detector 120 measures, detects, derives, or otherwise obtains timing information such as Ton, Toff, and/or COM based at least partially on IL. In other examples, the buck-boost region detector 120 receives at least one control signal from the gate driver 125, discussed below, and determines a region of operation of the power converter 110 based on the received control signal. For example, the buck-boost region detector 120 measures, detects, derives, or otherwise obtains timing information such as Ton, Toff, and/or COM based at least partially on the received control signal (e.g., such as based on an amount of time that the received control signal has a high value or a low value). In at least one example, the buck-boost region detector 120 is coupled, and provides a signal, to the gate driver 125 to control the gate driver 125 controlling of the power converter 110, for example, such that the gate driver 125 modifies its control of the power converter 110 based on the region of operation determined by, and mode of operation indicated by, the buck-boost region detector 120. In some examples, the buck-boost region detector 120 determines the mode of operation based on the timing information, one or more timer outputs, and/or a present state of a state machine implemented by the buck-boost region detector 120.

In various examples, the gate driver 125 is any suitable driver, component, or combination of components for controlling the power converter 110 (e.g., by coupling to, and exerting control on, gate terminals of the power transistors of the power converter 110). In at least one example, the gate driver 125 includes at least one driver (not shown) configured to generate a high-current control gate drive signal based on a received input signal. For example, when the gate driver 125 receives a first input signal from the loop controller 115, the gate driver 125 may control a first subset of power transistors of the power converter 110 to turn (or remain) on while controlling a remainder of the power transistors of the power converter 110 to remain (or turn) off. When the gate driver 125 receives a second input signal from the loop controller 115, the gate driver 125 may control a second subset of the power transistors of the power converter 110 to turn (or remain) on and a remainder of the power transistors of the power converter 110 to remain (or turn) off. In some examples, the loop controller 115 may include the COM time generator (not shown) that may generate the COM1 and/or COM2 time.

In at least one example, the gate driver 125 receives an indication from the buck-boost region detector 120 indicating whether the power converter 110 is operating in the buck-boost region (or whether the power converter 110 is operating in the buck region or the boost region). In some examples, the gate driver 125 controls the power converter 110 at least partially according to the indication received from the buck-boost region detector 120 indicating whether the power converter 110 is operating in the buck-boost region, the buck region, or the boost region. For example, when the power converter 110 is not operating in the buck-boost region, the gate driver 125 controls the power converter 110 directly according to an input (e.g., a control signal) received from the loop controller 115 (e.g., to generate a triangular inductor current waveform in the power converter 110). When the power converter 110 is operating in the buck-boost region, in some examples, the gate driver 125 may control the power converter 110 to generate a trapezoidal inductor current waveform.

Figure 2:
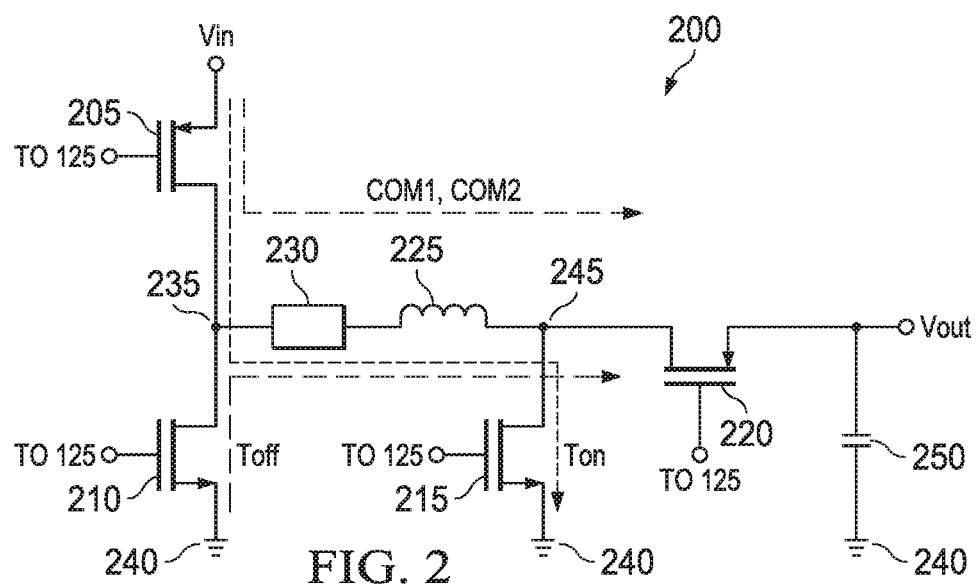
FIG. 2 is a schematic diagram of an illustrative buck-boost power converter.

Referring now to FIG. 2, a schematic diagram of an illustrative buck-boost power converter 200 is shown. In at least one example, the buck-boost power converter 200 is suitable for implementation as the power converter 110 of the SMPS 100 of FIG. 1, discussed above. In one example, the buck-boost power converter 200 includes a plurality of metal oxide semiconductor field effect transistors (MOSFETs) 205, 210, 215, and 220, and at least one energy storage device (illustrated in this example as an inductor 225). In another example, the buck-boost power converter 200 further includes a second inductor (not shown) and/or a fly-capacitor (not shown). In one example, the MOSFETs 205 and 220 are implemented as p-type MOSFETs (PMOS) and the MOSFETs 210 and 215 are implemented as n-type MOSFETs (NMOS). In at least one example, the buck-boost power converter 200 further includes a sense element 230 suitable for sensing IL of the inductor 225. The sense element 230 is, for example, a MOSFET, a resistor, or any other suitable means of sensing, measuring, or detecting IL. In at least one example, the sense element 230 is implemented by one of the MOSFETs 205, 210, 215, or 220 such that the sense element 230 is not an independent, additional component of the buck-boost power converter 200.

In one example architecture, a source terminal of the MOSFET 205 is configured to receive Vin, a drain terminal of the MOSFET 205 is coupled to a node 235, and a gate terminal of the MOSFET 205 is coupled to a controller (e.g., such as the gate driver 125 of the controller 105 of the SMPS 100 of FIG. 1, discussed above). A drain terminal of the MOSFET 210 is coupled to the node 235, a source terminal of the MOSFET 210 is coupled to a ground node 240, and a gate terminal of the MOSFET 210 is coupled to the controller. A first terminal of the inductor 225 is coupled to the node 235 and a second terminal of the inductor 225 is coupled to a node 245. In at least one example, the sense element 230 is coupled in series between node 235 and the first terminal of the inductor 225. In another example, a drain terminal of the MOSFET 215 is coupled to the node 245, a source terminal of the MOSFET 215 is coupled to the ground node 240, and a gate terminal of the MOSFET 215 is coupled to the controller. A drain terminal of the MOSFET 220 is coupled to the ground node 240, a source terminal of the MOSFET 220 provides Vout from the buck-boost power converter 200 (e.g., such that the source terminal of the MOSFET 220 is configured to couple to a load (not shown)), and a gate terminal of the MOSFET 220 is coupled to the controller. In at least one example, the inductor 225 is implemented as an external component such that the buck-boost power converter 200 does not include the inductor 225 but is configured to couple to the inductor 225 between the node 235 and the node 245. In at least one example, the buck-boost power converter 200 is configured to couple to a capacitor 250 (e.g., such as a filtering capacitor) between the source terminal of the MOSFET 220 and the ground node 240.

In one example, the MOSFETs 205, 210, 215, and/or 220 are controlled to turn on (e.g., conduct current between their respective drain terminals and source terminals) and/or turn off (e.g., cease conducting current between their respective drain terminals and source terminals) based on a signal received at their respective gate terminals. For example, based on a signal (e.g., a control signal) received from the controller, one or more of the MOSFETs 205, 210, 215, and/or 220 are controlled to turn on or turn off. The MOSFETs 205, 210, 215, and/or 220 may turn on (or off) based on a value, or relationship between values, present at one or more of the respective gate terminals and/or source terminals of the MOSFETs 205, 210, 215, and/or 220.

As further illustrated in FIG. 2, in at least one example the buck-boost power converter 200 is configured to operate in at least three operations modes. During a first operation mode (e.g., Ton), MOSFETs 205 and 215 are controlled by the controller to be turned on while MOSFETs 210 and 220 are controlled by the controller to be turned off. During the first operation mode, a path from Vin to ground is formed through the MOSFET 205, inductor 225, and MOSFET 215, thereby enabling the inductor 225 to charge from Vin. During a second operation mode (Toff), MOSFETs 205 and 215 are controlled by the controller to be turned off while the MOSFETs 210 and 220 are controlled by the controller to be turned on. During the second operation mode, a path from the ground node 240 to a node (e.g., the source terminal of the MOSFET 220) of the buck-boost power converter 200 to which a load may couple to receive Vout is formed through the MOSFET 210, inductor 225, and MOSFET 220, thereby enabling the inductor 225 to discharge to provide Vout. During a third operation mode (COM1 and/or COM2), MOSFETs 205 and 220 are controlled by the controller to be turned on and the MOSFETs 210 and 215 are controlled by the controller to be turned off. During the third operation mode, Vin and Vout have approximately the same value such that a voltage difference across the inductor 225 is minimal. When the voltage difference across the inductor 225 is minimal, in at least one example the inductor 225 may function approximately as a short between Vin and Vout with minimal effects on the value of Vout.

In at least some examples, the buck-boost power converter 200 is controlled to operate in the first operation mode, the second operation mode, or the third operation mode based on a region of operation of the buck-boost power converter 200. For example, when the buck-boost power converter 200 is operating in the buck region, the buck-boost power converter 200 is controlled to operate in the first operation mode, the second operation mode, or the third operation mode according to the buck mode of operation. When the buck-boost power converter 200 is operating in the boost region, the buck-boost power converter 200 is controlled to operate in the first operation mode, the second operation mode, or the third operation mode according to the boost mode of operation. When the buck-boost power converter 200 is operating in the buck-boost region, the buck-boost power converter 200 is controlled to operate in the first operation mode, the second operation mode, or the third operation mode according to the buck-boost mode of operation. The buck-boost power converter 200 is controlled to operate in the buck mode of operation, the boost mode of operation, or the buck-boost mode of operation, in some examples, based at least partially on the output of a buck-boost region detector, such as the buck-boost region detector 120 of the controller 105 of SMPS 100, discussed above with respect to FIG. 1.

Figure 3:
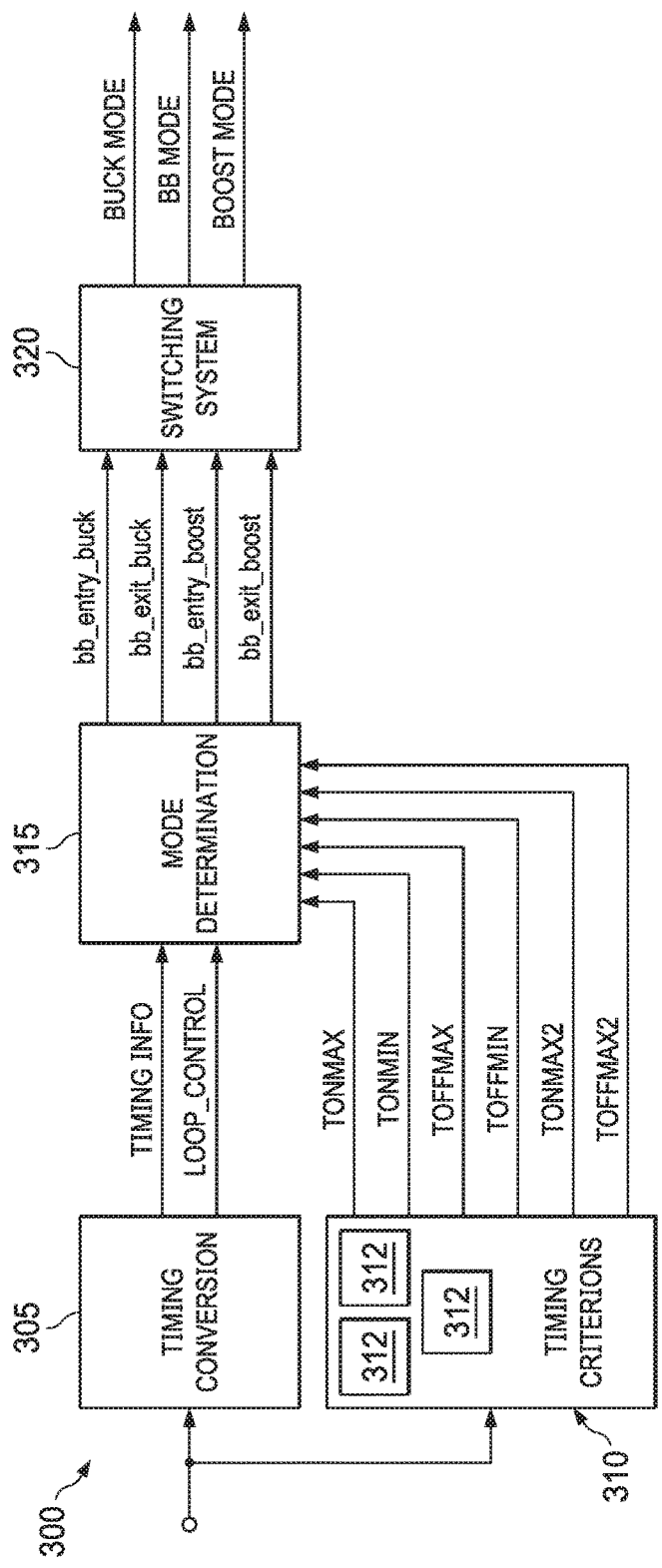
FIG. 3 is a block diagram of an illustrative buck-boost region detector.

Referring now to FIG. 3, a block diagram of an illustrative buck-boost region detector 300 is shown. The buck-boost region detector 300, in some examples, is suitable for implementation as the buck-boost region detector 120 of the controller 105 of SMPS 100, discussed above with respect to FIG. 1. In at least one example, buck-boost region detector 300 includes a timing generator circuit 305, a timing criterions circuit 310, a mode determination circuit 315 and a switching circuit 320. In various examples, the buck-boost region detector 300 may include a greater or fewer number of circuits, and/or functions of one of the timing criterions circuit 310, mode determination circuit 315, or switching circuit 320 may be implemented by another of the timing criterions circuit 310, mode determination circuit 315, or switching circuit 320. For example, in at least some architectures of the buck-boost region detector 300, the timing generator circuit 305 may be omitted.

In some examples, the timing generator circuit 305 has an input configured to receive a signal representative of an inductor current of a power converter. In various examples, the signal representative of the inductor current of the power converter is a measured inductor current, a measured transistor current (e.g., of a power transistor of the power converter from which current flows to the inductor), a gate control signal (e.g., for controlling a transistor through which current flows to the inductor), or any other suitable signal associated with a power converter and providing an indication of an inductor current of the power converter (e.g., indicating when the inductor current is charging, otherwise referred to as indicating when the power converter is operating in Ton, or when the inductor is operating substantially as a short). In at least some examples, the timing generator circuit 305 includes circuitry suitable for determining timing information relating to the inductor current. For example, the timing generator circuit 305 includes any circuitry suitable for determining Ton, Toff, and/or COM such as one or more timers (e.g., resistor-capacitor (RC) timers) suitable for determining time characteristics for the received signal. As one example, the timing generator circuit 305 includes circuitry (e.g., a processor and/or logic gates or structures) suitable for decoding gate signals of transistors, such as the MOSFET 205 and/or the MOSFET 220. For example, when the MOSFET 205 and/or the MOSFET 220 conduct between their respective source and drain terminals, the gate terminal of the respective MOSFET 205 or the MOSFET 220 has a low (e.g., digital logic low) value. Performing a not-OR (NOR) operation, such as using a NOR digital logic gate, between gate signals of the MOSFET 205 and the MOSFET 220 indicates that a Buck-ON time is active in the circuit that includes the MOSFET 205 and the MOSFET 220. In yet other examples, as discussed above, the timing generator circuit 305 is omitted from the buck-boost region detector 300 and the signal (e.g., such as a gate control signal, as discussed above) is provided directly to the mode determination circuit 315.

In some examples, the timing criterions circuit 310 is also configured to receive the same signal as is received by the timing generator circuit 305 (or provided directly to the mode determination circuit 315 when the timing generator circuit 305 is omitted). In various examples, the timing criterions circuit 310 includes any circuitry suitable for determining whether the received signal is greater than, or less than, one or more thresholds. In at least one example, the timing criterions circuit 310 includes a plurality of timers 312 each configured to indicate whether the received signal is greater than, or less than, a threshold. In various examples, the timers 312 each take any suitable form, and not all timers 312 of the timing criterions circuit 310 must be of the same form, architecture, or type. For example, the timers 312 can be implemented as RC timers, a combination of a current source and a capacitor, and/or any other suitable form of timing component or circuit, the scope of which is not limited herein. The thresholds are, for example and depending on an architecture and operational nature of a power converter associated with the received signal, a maximum Ton (Tonmax), a minimum Ton (Tonmin), a maximum Toff (Toffmax), a minimum Toff (Toffmin), a second maximum Ton (Tonmax2), and/or a second maximum Toff (Toffmax2).

In some examples, the mode determination circuit 315 is configured to receive the timing characteristics determined by the timing generator circuit 305 (or alternatively, the signal representative of the inductor current of the power converter when the timing generator circuit 305 is omitted) and receive outputs of the timers 312 of the timing criterions circuit 310. In at least some examples, the mode determination circuit 315 is further configured to receive an input signal (Loop_Control) from a loop controller, such as a loop controller configured to at least partially control the power converter from which the signal representative of the inductor current is received). The input signal from the loop controller, in some examples, indicates whether an output of the power converter (e.g., voltage and/or current) is sufficient with respect to a predefined value (e.g., a user-specified or desired output for the power converter) and is at least partially used to control the power converter. In at least one example, the mode determination circuit 315 includes any circuitry suitable for determining a mode of operation at least partially for controlling the power converter. The circuitry, in some examples, enables the mode determination circuit 315 to determine a current mode of operation of the power converter based on one or more of the signals received by the mode determination circuit 315 and/or determine a mode of operation for at least partially controlling the power converter. For example, some implementations of the mode determination circuit 315 include any circuitry suitable for making a decision based on received inputs, such as a plurality of logic circuits (e.g., implemented using any combination of digital or analog technology components), a processor, micro-processor, field-programmable gate array (FPGA) or any other suitable circuitry, the scope of which is not limited herein. In some examples, the circuitry of the mode determination circuit 315 is generally referred to as a processing element. In at least one example, the circuitry of the mode determination circuit 315 is suitable for implementing a state machine suitable for operation according to the state diagram 400, discussed below with respect to FIG. 4. As one example, when a switching circuit is operating in the buck-boost region and Tonmin is a logical high signal, the switching circuit should be operating according to a Ton operation mode. However, when Loop_Control indicates that Ton is no longer needed based on various criteria, the switching circuit should no longer operate according to the Ton operation mode. This contradictory information is, in some example, an indication to exit operation in the buck-boost region. Accordingly, in such an example, the mode determination circuit 315 includes circuitry (e.g., a processor and/or logic gates or structures) suitable for determining when both Tonmin and Loop_Control are logical high signals. For example, the mode determination circuit 315 includes an AND digital logic gate configured to generate bb_exit_buck when Tonmin and Loop_Control are both logical high signals.

The state machine, in some examples, includes multiple states and transitions from one of the multiple states to another of the multiple of states based on any one or more of the timing characteristics determined by the timing generator circuit 305 (or alternatively, the signal representative of the inductor current of the power converter when the timing generator circuit 305 is omitted), the input signal from the loop controller, and/or any one or more received outputs of the timers 312 of the timing criterions circuit 340. At each of the multiple states, the state machine outputs one or more of a bb_entry_buck signal indicating entry into the buck-boost region of operation from the buck mode of operation, a bb_exit_buck signal indicating exit from the buck-boost region of operation to the buck mode of operation, a bb_entry_boost signal indicating entry into the buck-boost region of operation from the boost mode of operation, and/or a bb_exit_boost signal indicating exit from the buck-boost region of operation to the boost mode of operation. For example, based on any one or more of a value of the timing characteristics determined by the timing generator circuit 305 (or alternatively, the signal representative of the inductor current of the power converter when the timing generator circuit 305 is omitted), a value of the input signal from the loop controller, and/or a value of any one or more received outputs of the timers 312 of the timing criterions circuit 340, the state machine outputs one or more signals. The one or more signals output include any one or more of the bb_entry_buck, bb_exit_buck, bb_entry_boost, and/or bb_exit_boost signals and are provided to the switching circuit 320.

In at least one example, each unique combination of possible input signals received by the state machine corresponds to a state of the state machine. Each state of the state machine further corresponds to a unique combination of output signals provided by the state machine. For example, based on a result of one or more logical operations performed on the input signals received by the state machine, the state machine generates the output signals. For example, for a first combination of input signals, the state machine exists in, and/or transitions to, a first state and outputs a first combination of output signals. Based on a change to one or more of the input signals of the first combination of input signals, the state machine may transition to a second state and output a second combination of output signals. In various examples, the state machine receives any number of input signals, include any number of states, and output any number of output signals. In at least one example, the state machine is implemented via, or comprises, a logic circuit or logic structure such as, or including any one or more of, one or more digital logic gates, one or more data storage elements (e.g., such as flip-flops or registers), a FPGA, an application specific integrated circuit (ASIC), and/or any other circuits, components, or combinations of circuits and/or components capable of generating at least one output signal based on a combination of input signals.

In some examples, the switching circuit 320 is configured to receive any one or more of the bb_entry_buck, bb_exit_buck, bb_entry_boost, and/or bb_exit_boost signals from the mode determination circuit 315 and generate one or more control signals for at least partially controlling operation of the power converter. For example, the control signal is any one or more of a Buck Mode control signal configured to cause the power converter to operate in the buck mode, a BuckBoost Mode control signal configured to cause the power converter to operate in the buck-boost mode, and/or a Boost Mode control signal configured to cause the power converter to operate in the boost mode. In at least one example, the switching circuit 320 includes any circuitry suitable for generating a control signal for at least partially controlling the power converter according to one or more of the bb_entry_buck, bb_exit_buck, bb_entry_boost, and/or bb_exit_boost signals. In some examples, the circuitry comprises one or more logic circuits (e.g., implemented using any combination of digital or analog technology components) and/or a micro-processor or processor. As one example, each of the bb_entry_buck, bb_exit_buck, bb_entry_boost, and/or bb_exit_boost signals corresponds to a unique combination of control signals, such as gate control signals for providing to gate terminals of transistors of a power converter (e.g., such as the MOSFETs 205, 210, 215, and/or 220 of FIG. 2). As such, the switching circuit 320 implements one or more logical structures (e.g., AND gate, OR gate, NOR gate, etc.) to determine a control signal for output by the switching circuit 320 based on a value of one or more of the bb_entry_buck, bb_exit_buck, bb_entry_boost, and/or bb_exit_boost signals and one or more of the control signals being output by the switching circuit 320.

Figure 4:
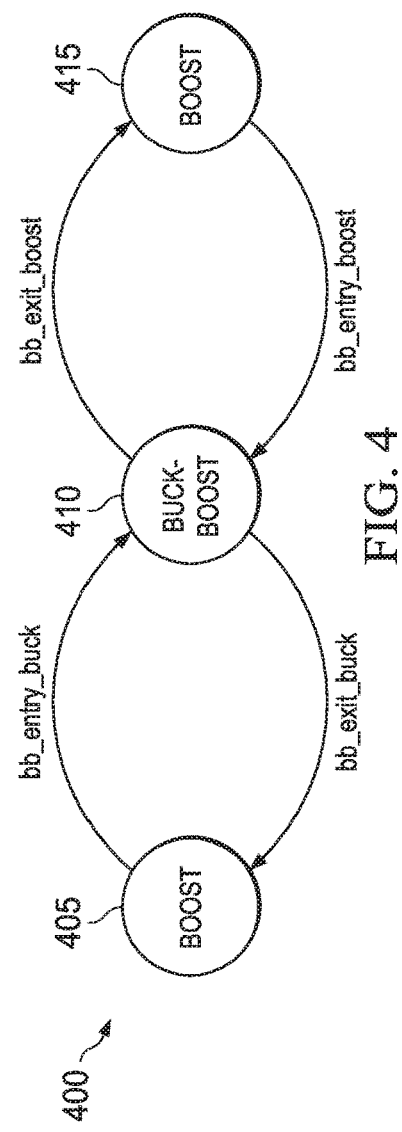
FIG. 4 is an illustrative state diagram.

Referring now to FIG. 4, an illustrative state diagram 400 is shown. In at least some examples, the state diagram 400 is illustrative of operation of a state machine or other logic circuit(s) of the mode determination circuit 315 of the buck-boost region detector 300 of FIG. 3. Accordingly, signals previously discussed as being received as input or provided as output by the mode determination circuit 315 are referenced in the following discussion of state diagram 400. In at least one example, state diagram 400 includes a buck state 405, a buck-boost state 410, and a boost state 415.

The power converter that is controlled at least partially according to an output of the state machine illustrated by state diagram 400 may be implemented in a predictive Ton system or a predictive Toff system. In a predictive Ton system, Ton is a constant (e.g., a predicted or calculated, such as based at least partially on Vin and/or Vout) value and Toff is a value determined by a control loop. In a predictive Toff system, Toff is a constant (e.g., a predicted or calculated, such as based at least partially on Vin and/or Vout) value and Ton is a value determined by a control loop. Based on one or more input signals, and whether the power converter is implemented in the predictive Ton system or the predictive Toff system, the state machine illustrated by state diagram 400 transitions from one of the buck state 405, the buck-boost state 410, or the boost state 415 to another of the buck state 405, the buck-boost state 410, or the boost state 415.

Figure 5:
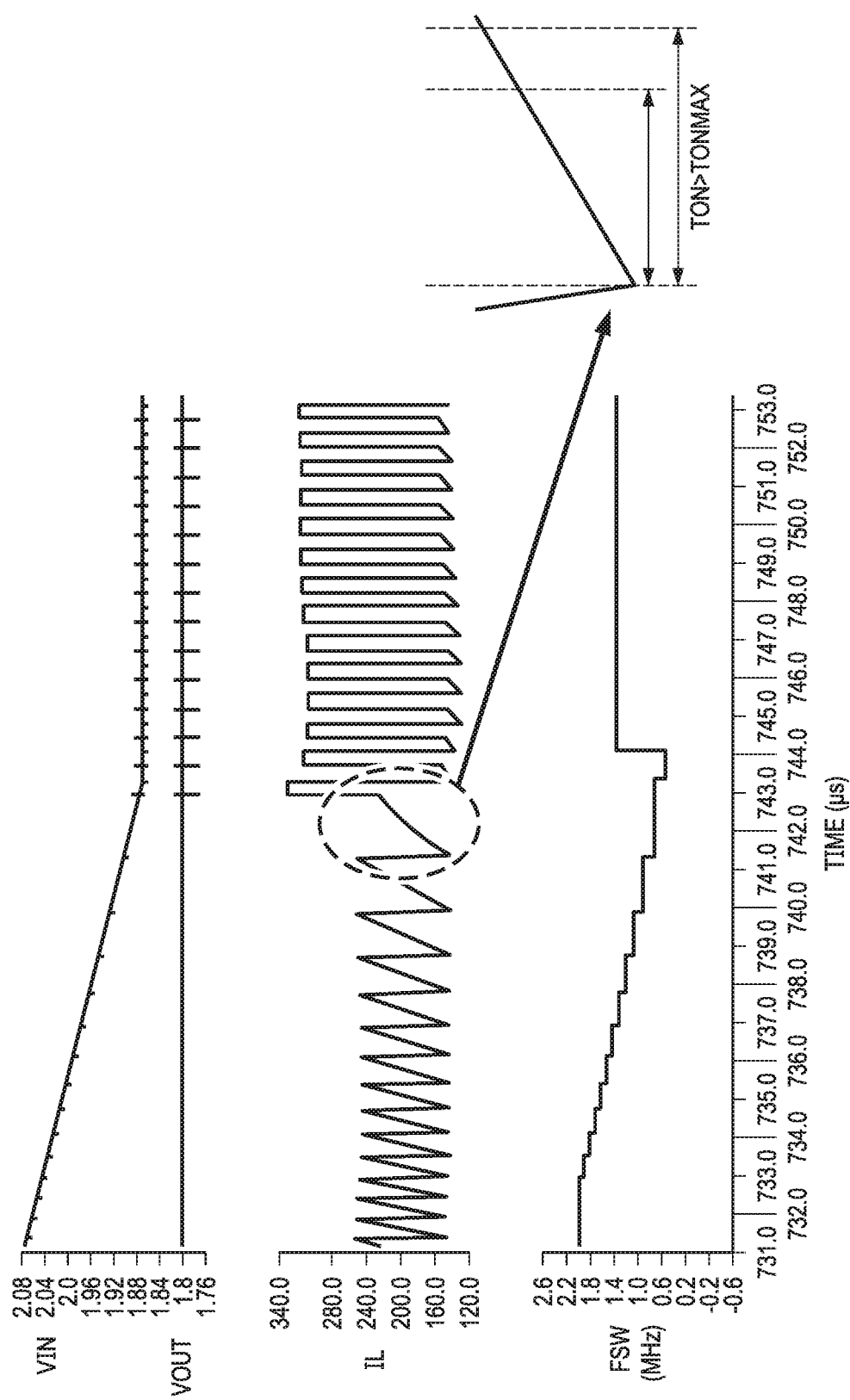
FIG. 5 is an illustrative diagram of waveforms illustrating transition from a buck mode of operation to a buck-boost mode of operation.

Turning first to the implementation of the power converter in a predictive Toff system, the state machine begins operation in one state of the state diagram 400. For the sake of discussion herein, it is assumed that the state machine begins in the buck state 405, though the present disclosure is not limited thereto and the state machine may instead begin in the buck-boost state 410 or the boost state 415. While operating in the buck state 405, the state machine monitors one or more received signals to determine whether Ton exceeds Tonmax. When Ton does not exceed Tonmax, the state machine remains at buck state 405. When Ton exceeds Tonmax, as illustrated in FIG. 5, the state machine outputs bb_entry_buck as a logical high value (e.g., to cause the switching circuit 320 to output the BuckBoost Mode control signal as a logical high value) and transitions from the buck state 405 to the buck-boost state 410.

While operating in the buck-boost state 410, the state machine monitors one or more received signals to determine whether Loop_Control is a logical high value during the COM2 mode of operation of the power converter, indicating the loop controller requesting additional current output by the power converter while operating in the COM2 mode of operation. When Loop_Control is a logical high value during the COM2 mode of operation of the power converter, the state machine remains at buck-boost state 410. When Loop_Control is a logical low value during the COM2 mode of operation of the power converter, the state machine outputs bb_exit_buck as a logical high value (e.g., to cause the switching circuit 320 to output the Buck Mode control signal as a logical high value) and transitions from the buck-boost state 410 to the buck state 405, for example, because Loop_Control becoming a logical low value before the beginning of a Ton operation mode indicates that less than zero Ton is required in the circuit.

Figure 6:
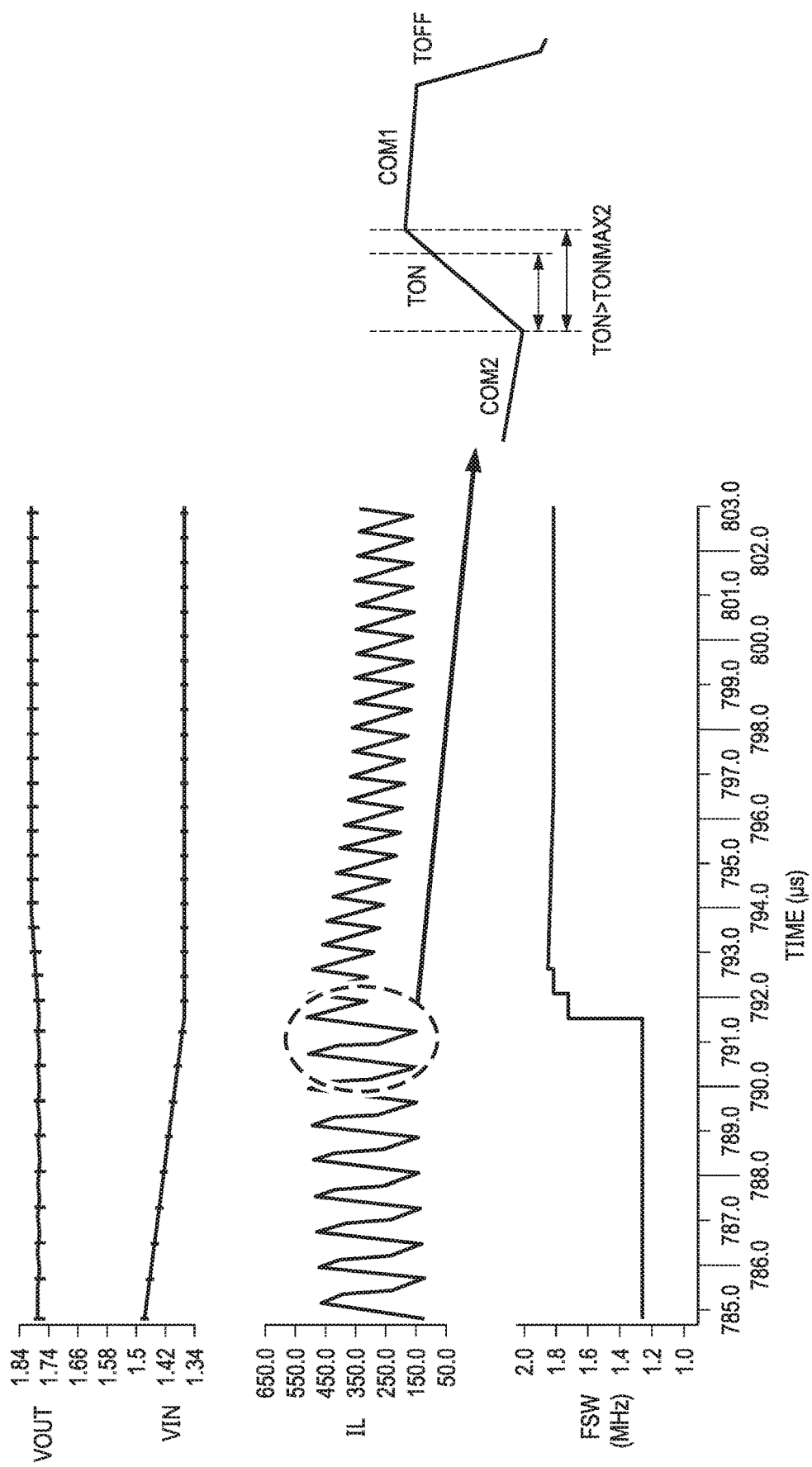
FIG. 6 is an illustrative diagram of waveforms illustrating transition from a buck-boost mode of operation to a boost mode of operation.

Further, while operating in the buck-boost state 410, the state machine monitors one or more received signals to determine whether Ton exceeds Tonmax2. When Ton does not exceed Tonmax2, the state machine remains at buck-boost state 410. When Ton exceeds Tonmax2, as illustrated in FIG. 6, the state machine outputs bb_exit_boost as a logical high value (e.g., to cause the switching circuit 320 to output the Boost Mode control signal as a logical high value) and transitions from the buck-boost state 410 to the boost state 415.

Figure 7:
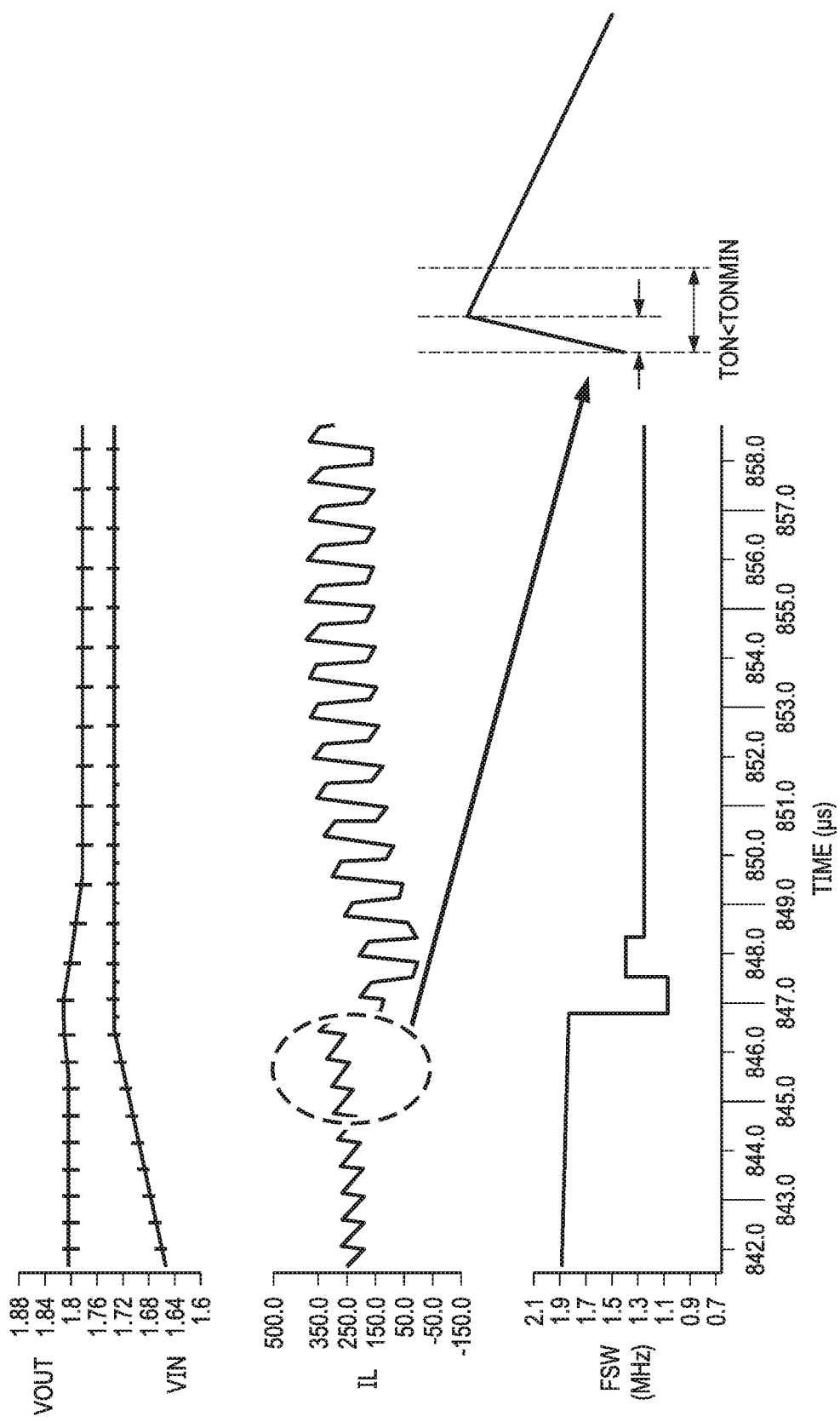
FIG. 7 is an illustrative diagram of waveforms illustrating transition from a boost mode of operation to a buck-boost mode of operation.

While operating in the boost state 415, the state machine monitors one or more received signals to determine whether Ton is greater than Tonmin. When Ton is greater than Tonmin, the state machine remains at boost state 415. When Ton is not greater than Tonmin, as illustrated in FIG. 7, the state machine outputs bb_entry_boost as a logical high value (e.g., to cause the switching circuit 320 to output the BuckBoost Mode control signal as a logical high value) and transitions from the boost state 415 to the buck-boost state 410.

Turning now to the implementation of the power converter in a predictive Ton system, while operating in the buck state 405, the state machine monitors one or more received signals to determine whether Toff is greater than Toffmin. When Toff is greater than Toffmin, the state machine remains at buck state 405. When Toff is not greater than Toffmin, the state machine outputs bb_entry_buck as a logical high value (e.g., to cause the switching circuit 320 to output the BuckBoost Mode control signal as a logical high value) and transitions from the buck state 405 to the buck-boost state 410.

While operating in the buck-boost state 410, the state machine monitors one or more received signals to determine whether Toff exceeds Toffmax. When Toff does not exceed Toffmax, the state machine remains at buck-boost state 410. When Toff exceeds Toffmax, the state machine outputs bb_exit_buck as a logical high value (e.g., to cause the switching circuit 320 to output the Buck Mode control signal as a logical high value) and transitions from the buck-boost state 410 to the buck state 405.

Further, while operating in the buck-boost state 410, the state machine monitors one or more received signals to determine whether Loop_Control is a logical high value during the COM1 or Toff modes of operation of the power converter, indicating the loop controller requesting additional current output by the power converter while operating in the COM1 or Toff modes of operation. When Loop_Control is a logical low value during the COM1 and Toff modes of operation of the power converter, the state machine remains at buck-boost state 410. When Loop_Control is a logical high value during the COM1 or Toff modes of operation of the power converter, the state machine outputs bb_exit_boost as a logical high value (e.g., to cause the switching circuit 320 to output the Boost Mode control signal as a logical high value) and transitions from the buck-boost state 410 to the boost state 415.

While operating in the boost state 415, the state machine monitors one or more received signals to determine whether Toff is greater than Toffmax2. When Toff is not greater than Toffmax2, the state machine remains at boost state 415. When Toff is not greater than Toffmax2, the state machine outputs bb_entry_boost as a logical high value (e.g., to cause the switching circuit 320 to output the BuckBoost Mode control signal as a logical high value) and transitions from the boost state 415 to the buck-boost state 410.

Figure 8:
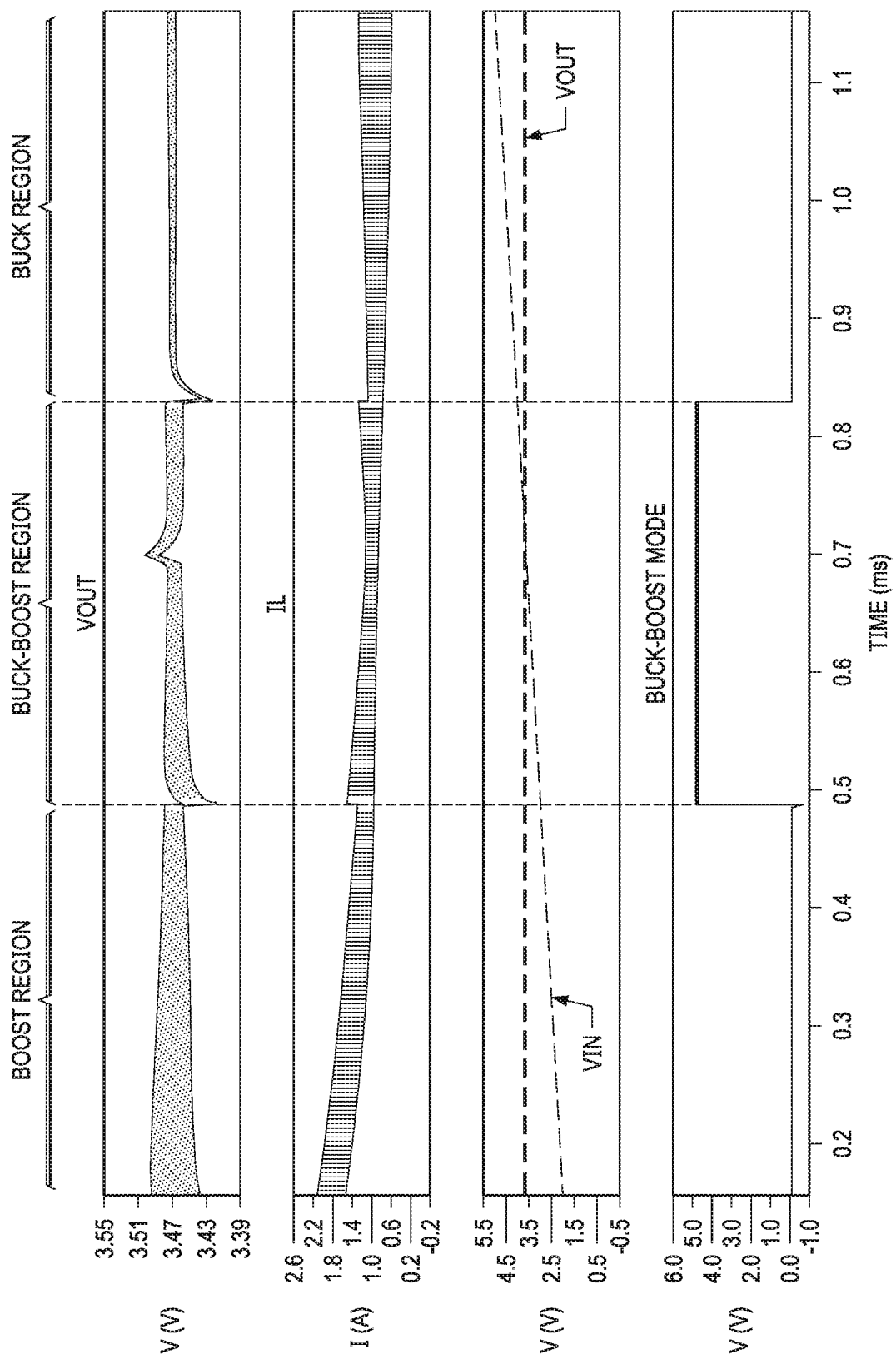
FIG. 8 is an illustrative diagram of control regions in a buck-boost power converter.

In at least some examples, the state machine or other logic circuit(s) of the mode determination circuit 315 of the buck-boost region detector 300 that operate at least partially according to the state diagram 400 are configured to optimize a buck-boost region of operation window position and width to optimize efficiency and overall operation of a buck-boost power converter. For example, as illustrated in FIG. 8 and discussed herein, a buck-boost power converter can be said to operate in three regions of operations, a buck region, a boost region, and a buck-boost region based on various criteria. Each of these regions of operation can be said to correspond to a window when looking at a diagram of signal inputs and outputs across those regions of operations, as illustrated in FIG. 8.

As discussed herein and illustrated in FIG. 8, in some examples ripple in IL has a minimum amplitude at approximately a point at which Vin and Vout are approximately equal. In at least some examples, as Vin varies from Vout, either in the positive or negative direction, from that point of approximate equality, the ripple amplitude in IL increases. As the ripple amplitude in IL increases, efficiency of the power converter decreases. Accordingly, in selecting a width for a buck-boost region window (e.g., the amount of time that the power converter generating Vout and IL will operate in the buck-boost region), in some examples the width is selected to be sufficiently small so as to minimize the ripple amplitude of IL while operating in the buck-boost region as Vin varies from Vout by greater amounts. Additionally, when selecting placement of the buck-boost region window (e.g., a center point of the buck-boost region window), in at least some examples efficiency and/or performance of the power convert is optimized when the buck-boost region window is centered on approximately the point at which Vin and Vout are approximately equal.

An additional consideration is that the buck-boost region window should be sufficiently large so that the power converter does, at least at some times, transition to operation in the buck-boost region of operation. For example, if the buck-boost region window is selected to have too small a width, in some circumstances the power converter may undesirably become stuck in either the buck region of operation or the boost region of operation when operation in the buck-boost region would increase efficiency and/or performance of the power converter, but the power converter is not able to transition to operation in the buck-boost region because of the selected width and/or placement of the buck-boost region window.

In at least some examples, by determining bb_entry_buck, bb_exit_buck, bb_entry_boost, and/or bb_exit_boost as disclosed herein, both a width and placement of the buck-boost region window is optimized. The width and placement of the buck-boost region window is optimized such that the buck-boost region window is sufficiently large so as to prevent becoming stuck in buck region operation or boost region operation, but sufficiently small so as to prevent operation in the buck-boost region when operation in the buck region or operation in the boost region would result in reduced ripple amplitude in IL. As shown in FIG. 8, during the period of time encompassed by the optimally-positioned buck-boost region window (e.g., as positioned and having a width determined according to the considerations discussed above), BuckBoost Mode has a high value to indicate that the power converter should be, or could potentially benefit from, operating in the buck-boost region of operation.

Figure 9:
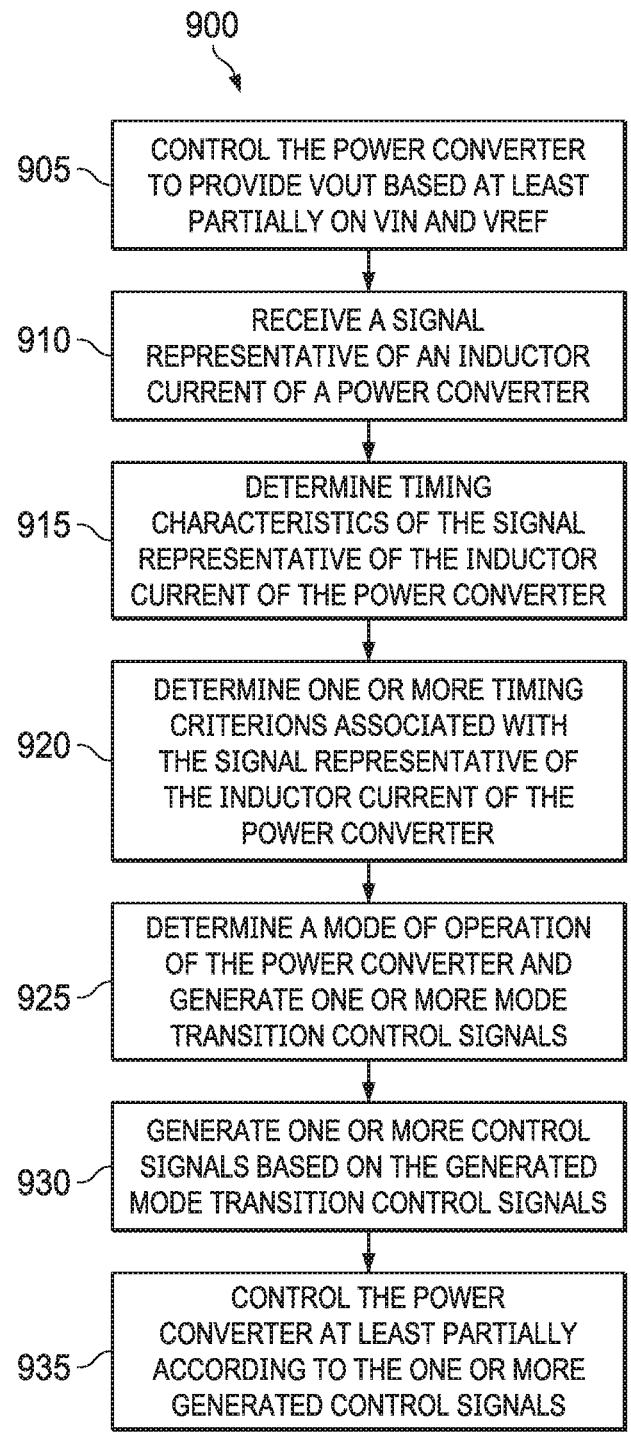
FIG. 9 is a flowchart of an illustrative method for controlling a power converter.

Referring now to FIG. 9, a flowchart of an illustrative method 900 for controlling a power converter is shown. The method 900 is performed, for example, by a controller such as the controller 105 of FIG. 1 to control a power converter such as the power converter 110 of FIG. 1 (which may be implemented as the buck-boost power converter 200 of FIG. 2), each as discussed above. In at least one example, the method 900 is implemented by the controller to detect a region of operation of the power converter (e.g., buck region, boost region, or buck-boost region) and control the power converter to transition from one region of operation to another region of operation.

At operation 905, the controller controls the power converter to provide Vout based at least partially on Vin and Vref. In at least some examples, the controller further controls the power converter to provide Vout at least partially based on a feedback signal (which may be Vout or a scaled representation of Vout).

At operation 910, the controller receives (e.g., at a buck-boost region detector of the controller) a signal representative of an inductor current of a power converter. In various examples, the signal representative of the inductor current of the power converter is a measured inductor current, a measured transistor current (e.g., of a power transistor of the power converter from which current flows to the inductor), a gate control signal (e.g., for controlling a transistor through which current flows to the inductor), or any other suitable signal associated with a power converter and providing an indication of an inductor current of the power converter (e.g., indicating when the inductor current is charging, otherwise referred to as indicating when the power converter is operating in Ton).

At operation 915, the controller determines timing characteristics of the signal representative of the inductor current of the power converter. In some examples, the controller determines the timing characteristics of the signal representative of the inductor current of the power converter by determining an amount of time that the signal representative of the inductor current of the power converter is increasing in value (e.g., during Ton), an amount of time that the signal representative of the inductor current of the power converter is decreasing in value (e.g., during Toff), and/or an amount of time that the signal representative of the inductor current of the power converter is remaining substantially the same in value (e.g., during COM1 or COM2). In other examples, the controller determines the timing characteristics of the signal representative of the inductor current of the power converter according to an amount of time that the signal representative of the inductor current of the power converter has a logical high value and/or has a logical low value. In at least some examples, operation 915 is omitted such that the controller directly utilizes the signal representative of the inductor current of the power converter for subsequent operations without first determining timing characteristics of the signal representative of the inductor current of the power converter.

At operation 920, the controller determines one or more timing criterions associated with the signal representative of the inductor current of the power converter. The timing criterions, in some examples, are determined by one or more timers of the controller, such as of a timing criterions circuit, and indicate whether Ton and/or Toff of the power converter have exceeded a threshold. The threshold may be any one or more of Tonmin, Tonmax, Tonmax2, Toffmin, Toffmax, and/or Toffmax2. The controller determines the one or more timing criterions, in some examples, by initiating the one or more timers upon receipt of the signal representative of the inductor current of the power converter and outputting an output signal when the signal representative of the inductor current of the power converter exceeds one of the thresholds. In some examples, the controller includes a plurality of timers such that each timer uniquely determines whether the signal representative of the inductor current of the power converter has exceeded one of the thresholds and a number of outputs generated by the timing criterions circuit is the same as the number of thresholds. In other examples, the controller includes fewer timers than there are thresholds such that at least some of the timers are reused for making multiple determinations.

At operation 925, the controller determines a mode of operation of the power converter and generates one or more mode transition control signals. The controller determines the mode of operation of the power converter, in some examples, based at least partially on the determinations of operation 915 and operation 920. For example, as discussed above herein with respect to FIG. 3 and FIG. 4, in at least some examples the controller implements a state machine that receives signals as inputs resulting from the determinations of operation 915 and operation 920 and generates the one or more mode transition control signals as outputs. In at least some other examples, the controller further generates the one or more mode transition signals according to a value of Loop_Control with respect to one or more of the received signals resulting from the determinations of operation 915 and operation 920. For example, based on a comparison of one or more of the received signals resulting from the determinations of operation 915 to one or more of the received signals resulting from the determinations of operation 920, the controller may generate one or more mode transition control signals as outputs. Similarly, based on a value of Loop_Control during a time period indicated by one or more of the received signals resulting from the determinations of operation 915 and operation 920, the controller may generate one or more mode transition control signals as outputs. In some examples, the one or more mode transition control signals include at least bb_entry_buck, bb_exit_buck, bb_entry_boost, and/or bb_exit_boost, as discussed above.

At operation 930, the controller generates one or more control signals based on the generated mode transition control signals. The controller generates the one or more control signals, in some examples, by performing one or more logical operations on the generated mode transition control signals to determine and generate the one or more control signals. In an example in which the mode transition control signal is bb_entry_buck or bb_entry_boost, the controller generates and outputs a BuckBoost Mode control signal as a logical high value, as discussed above. In an example in which the mode transition control signal is bb_exit_buck, the controller generates and outputs a Buck Mode control signal as a logical high value, as discussed above. In an example in which the mode transition control signal is bb_exit_boost, the controller generates and outputs a Boost Mode control signal as a logical high value, as discussed above.

At operation 935, the controller controls the power converter at least partially according to the one or more generated control signals. In at least one example, the controller provides the one or more generated control signals to a gate driver for use in controlling the power converter. For example, based on the generated control signal received by the gate driver, the gate driver may alter control of the power converter. In at least one example, controlling the power converter at least partially according to the one or more generated control signals includes controlling the power converter to generate a substantially trapezoidal inductor current waveform when the BuckBoost Mode control signal is a logical high value and controlling the power converter to generate a substantially triangular inductor current waveform when the Buck Mode control signal is a logical high value or the Boost Mode control signal is a logical high value.

While the operations of the method 900 have been discussed and labeled with numerical reference, the method 900 may include additional operations that are not recited herein, any one or more of the operations recited herein may include one or more sub-operations, any one or more of the operations recited herein may be omitted, and/or any one or more of the operations recited herein may be performed in an order other than that presented herein (e.g., in a reverse order, substantially simultaneously, overlapping, etc.), all of which is intended to fall within the scope of the present disclosure.

In the foregoing discussion and in the claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device, element or component couples to a second device, element or component, that connection may be through a direct connection or through an indirect connection via other devices, elements or components and connections. Similarly, a device that is coupled between a first component or location and a second component or location may be through a direct connection or through an indirect connection via other devices and connections. Additionally, uses of the phrase "ground voltage potential" in the foregoing discussion are intended to include a chassis ground, an Earth ground, a floating ground, a virtual ground, a digital ground, a common ground, and/or any other form of ground connection applicable to, or suitable for, the teachings of the present disclosure. Unless otherwise stated, "about," "approximately," or "substantially" preceding a value means +/− 10 percent of the stated value.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A circuit, comprising:
    a buck-boost region detector, comprising:
        a timing criterions circuit that comprises a timer, the timing criterions circuit is configured to receive a signal representative of an inductor current of the power converter and generate timing signals including threshold values;
        a mode determination circuit coupled to receive timing signals representing timing characteristics of a power converter from the timing criterions circuit and comprising a processing element; and
        a switching circuit coupled to the mode determination circuit and comprising a digital logic structure.

2. The circuit of claim 1, further comprising a timing generator circuit coupled to the timing criterions circuit and the mode determination circuit, wherein the timing generator circuit comprises a second timer.

3. The circuit of claim 1, wherein the processing element is configured to implement a state machine having at least three states.

4. The circuit of claim 1, wherein the mode determination circuit is configured to:
    receive a signal providing timing characteristics for operation of a power converter;
    receive timing criterion information indicating a relationship of the signal providing timing characteristics for operation of the power converter to a plurality of thresholds;
    receive a loop control signal from a loop controller configured to at least partially control the operation of the power converter; and
    generate a mode transition control signal indicating a transition in operation of the power converter from a first region of operation to a second region of operation based on at least two of the signal providing timing characteristics for operation of the power converter, the timing criterion information, and the loop control signal.

5. The circuit of claim 1, wherein the switching circuit is configured to:
    receive a plurality of mode transition control signals, the mode transition control signals indicating a transition in operation of a power converter from a first region of operation to a second region of operation; and
    generate a plurality of control signals according to the plurality of mode transition control signals, the control signals specifying operation of the power converter in a buck region of operation, a boost region of operation, or a buck-boost region of operation.

6. The circuit of claim 5, wherein the switching circuit is coupled to a gate driver configured to be coupled to the power converter, and wherein the switching circuit controls the gate driver via the plurality of control signals to operate in the buck region of operation, the boost region of operation, or the buck-boost region of operation based at least partially on the plurality of mode transition control signals.

7. The circuit of claim 1, wherein the buck-boost region detector is configured to:
    determine whether a power converter coupled to the circuit is operating in a buck region of operation, a boost region of operation, or a buck-boost region of operation; and
    generate a control signal for causing the power converter to transition from a first of the buck region of operation, the boost region of operation, or the buck-boost region of operation to a second of the buck region of operation, the boost region of operation, or the buck-boost region of operation.

8. A switched mode power supply (SMPS), comprising:
    a power converter; and
    a power converter controller, comprising:
        a loop controller configured to couple to the power converter to monitor at least one electrical characteristic of the power converter and generate a control signal based at least partially on the monitored electrical characteristic of the power converter;
        a buck-boost region detector coupled to the power converter and the loop controller, the buck-boost region detector comprising:
            a timing criterions circuit that comprises a timer, wherein the timing criterions circuit is configured to receive a signal representative of an inductor current of the power converter and generate the timing signals including threshold values;
            a mode determination circuit coupled to receive timing signals representing timing characteristics of the power converter from the timing criterions circuit and comprising a processing element; and
            a switching circuit coupled to the mode determination circuit and comprising a digital logic structure; and
        a gate driver configured to couple to the power converter, the power converter controller, and the buck-boost region detector to control the power converter based at least partially on an output of the switching circuit.

9. The SMPS of claim 8, wherein the buck-boost region detector further comprises a timing generator circuit coupled to the timing criterions circuit and the mode determination circuit, wherein the timing generator circuit comprises a second timer.

10. The SMPS of claim 8, wherein the mode determination circuit is configured to:
    receive a signal providing timing characteristics for operation of the power converter;

receive timing criterion information indicating a relationship of the signal providing timing characteristics for operation of the power converter to a plurality of thresholds;

receive a loop control signal from a loop controller configured to at least partially control the operation of the power converter; and generate a mode transition control signal indicating a transition in operation of the power converter from a first region of operation to a second region of operation based on at least two of the signal providing timing characteristics for operation of the power converter, the timing criterion information, and the loop control signal.

11. The SMPS of claim 10, wherein the switching circuit is configured to:

receive a plurality of mode transition control signals, the mode transition control signals indicating a transition in operation of the power converter from a first region of operation to a second region of operation; and generate a plurality of control signals according to the plurality of mode transition control signals, the control signals specifying operation of the power converter in a buck region of operation, a boost region of operation, or a buck-boost region of operation.

12. The SMPS of claim 9, wherein the switching circuit is coupled to the gate driver, and wherein the switching circuit controls the gate driver via the plurality of control signals to operate in the buck region of operation, the boost region of operation, or the buck-boost region of operation based at least partially on the plurality of mode transition control signals.

13. The SMPS of claim 8, wherein the buck-boost region detector is configured to:

determine whether the power converter is operating in a buck region of operation, a boost region of operation, or a buck-boost region of operation; and generate a control signal for causing the power converter to transition from a first of the buck region of operation, the boost region of operation, or the buck-boost region of operation to a second of the buck region of operation, the boost region of operation, or the buck-boost region of operation.

* * * * *